Fig. 2

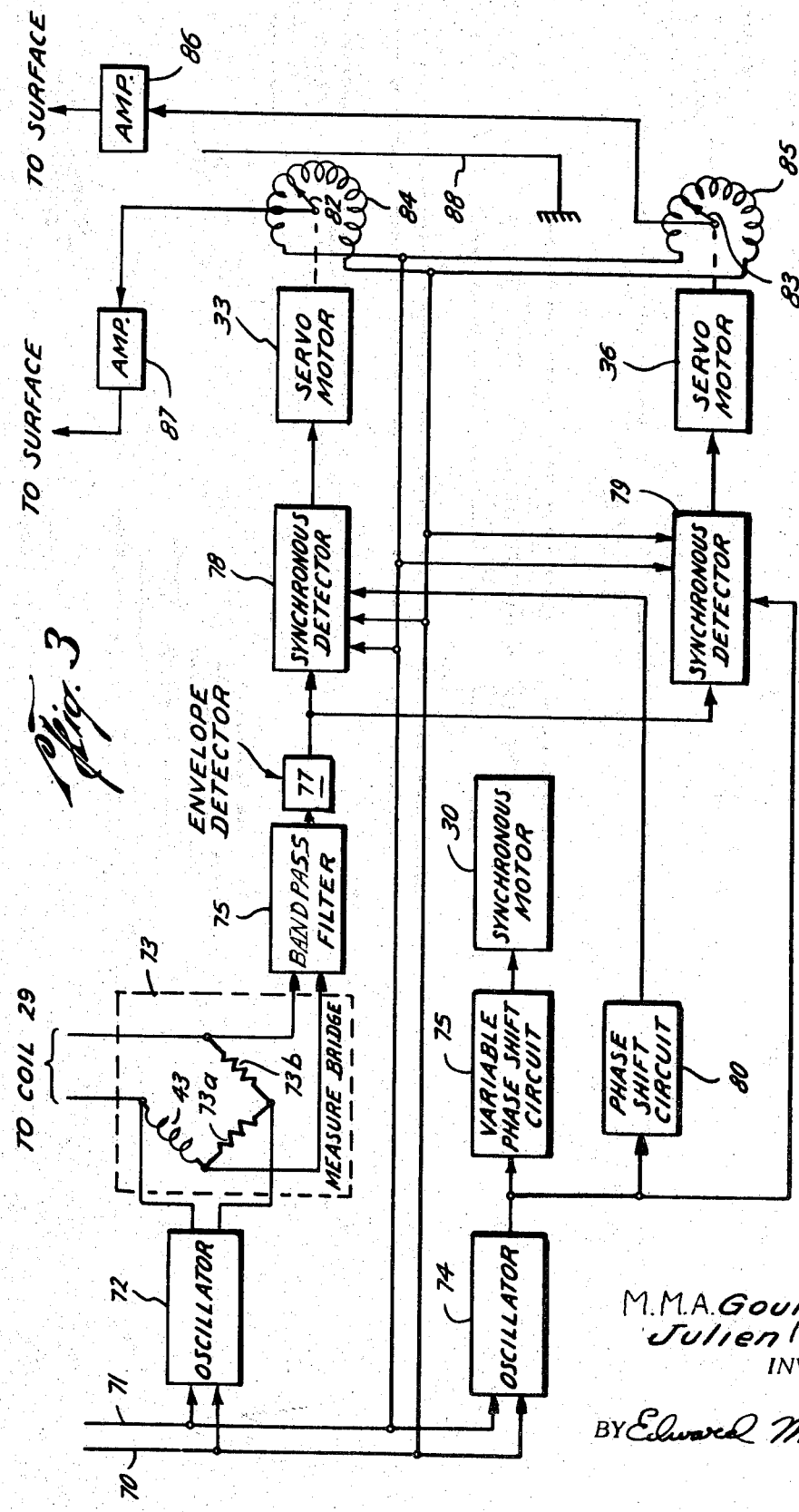

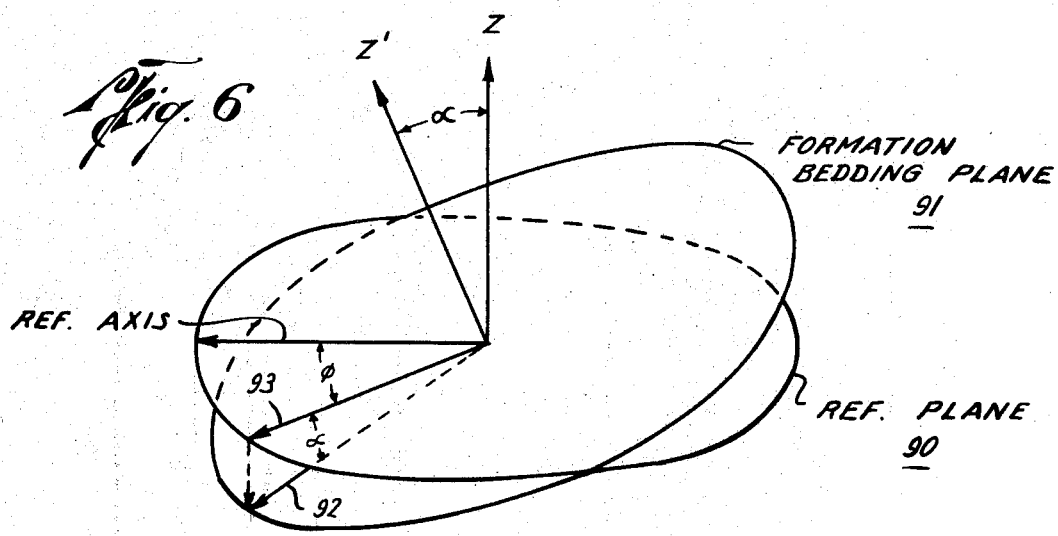
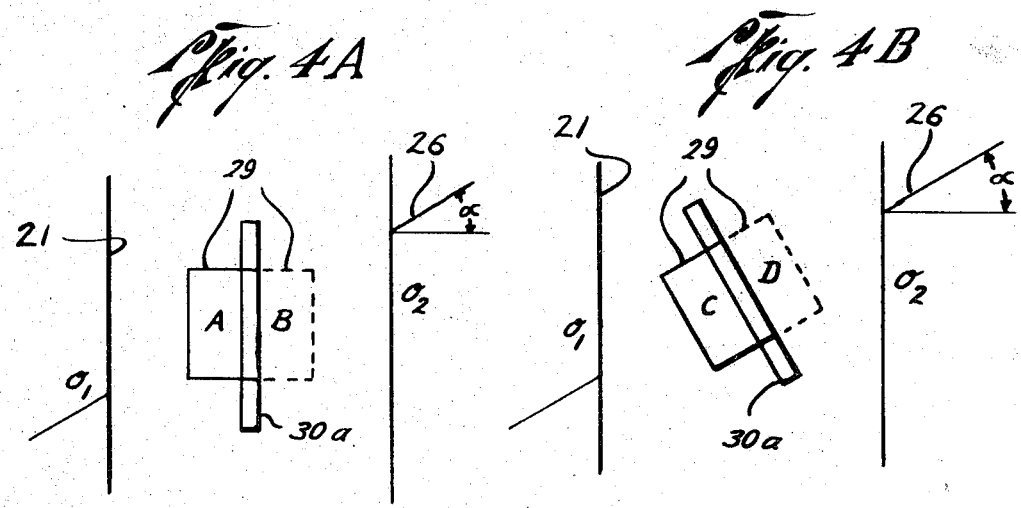
M. M. A. *Gouilloud*
Julien M *Loeb*
INVENTORS
BY *Edward M. Roney*
ATTORNEY M.M.A. Gouilloud
Julien M. Loeb
INVENTORS BY Edward M. Roney
ATTORNEY

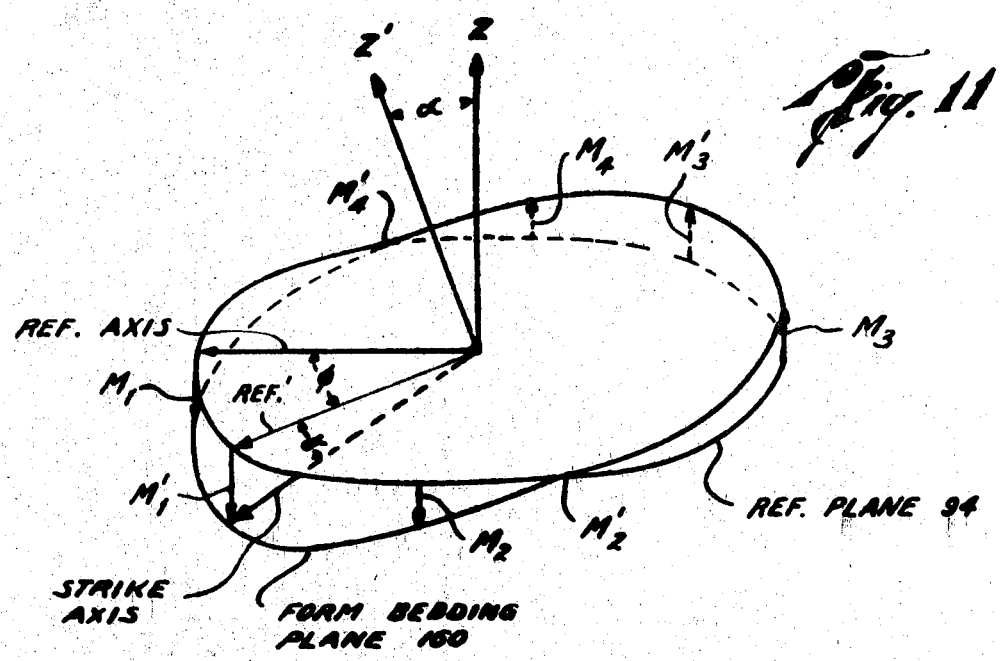
Fig. 11
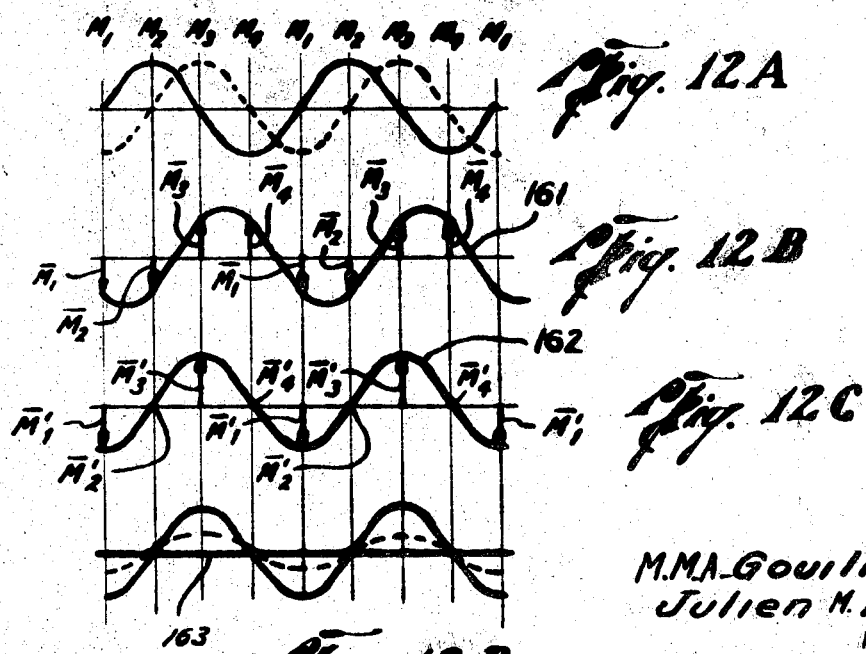
Fig. 12A
Fig. 12B
Fig. 12C
Fig. 12D
M. M. A. Gouilloud
Julien M. Loeb
INVENTORS
BY Edward M. Roney
ATTORNEY 3,561,007
METHODS AND APPARATUS FOR INVESTIGATING EARTH FORMATIONS UTILIZING ROTATING ELECTROMAGNETIC FIELDS
Michel Marie Albert Gouilloud, Houston, Tex., and Julien M. Loeb, Saint-Cloud, France, assignors, by mesne assignments, to Schlumberger Technology Corporation, New York, N.Y., a corporation of Texas
Filed Sept. 11, 1968, Ser. No. 758,941
Claims priority, application France, Sept. 12, 1967, 120,779
Int. Cl. G01v 3/08, 3/18
U.S. Cl. 324—5
26 Claims

ABSTRACT OF THE DISCLOSURE

In accordance with illustrative embodiments of the present invention, methods and apparatus for determining the positioning of formation bedding planes by rotating one or more electromagnetic fields through formations surrounding a borehole are illustrated. In one embodiment, a solenoid-type coil is energized with current and rotated at a substantially constant velocity about an adjustable axis. An amplitude modulated signal will then be produced in the coil if there is a conductivity contrast or gradient in the formation plane which defines the sweep of the electromagnetic field. This amplitude modulated signal is then demodulated and the resulting modulation signal is synchronously detected by the signal which causes the coil rotation. This produces phase components which are used for bringing the axis of rotation of the coil into a substantially perpendicular direction to the low gradient formation plane and indicating the positioning of this plane. In another embodiment, two electromagnetic fields are rotated around a borehole at spaced apart depth levels by sequentially coupling a plurality of circumferentially spaced coil pairs to the adjoining formations. The signals from each coil of the coil pairs are combined in selected relationships to produce a composite signal for each coil pair. These composite signals are then used to adjust the relationship with which the individual coil signals are combined until each composite signal has substantially the same amplitude thus indicating the positioning of the low conductivity gradient formation plane.

This invention relates to the investigation of earth formations traversed by a borehole and more particularly to the determination of the positioning of earth formation bedding planes.

It is common practice to obtain measurements of the azimuthal direction and dip angle of formation bedding planes by passing a so-called "dipmeter" tool having a plurality of circumferentially spaced, pad mounted electrodes through a borehole. Survey current is emitted from certain ones of the electrodes on each pad member to obtain a measure of the resistivity or conductivity of the adjoining earth formations to produce a plurality of resistivity logs. By properly correlating the fluctuations of these resistivity logs, the positioning of a bedding plane relative to the tool position can be readily calculated. Then, by measuring the bearing of the tool relative to some azimuthal reference such as magnetic north and the inclination of the tool relative to the true vertical or gravitational axis, the position of a bedding plane relative to the north and true vertical axes can be determined.

While these prior resistivity type dipmeter apparatus have provided generally satisfactory results, there are some difficulties inherent in such a multiple pad type dipmeter. For example, it is not easy to accurately correlate a plurality of curves recorded on film. One reason for this is that the velocity of the investigating apparatus in the borehole may not be the same as the velocity of the recorder since the investigating apparatus is supported in the borehole on the end of a long elastic cable. Additionally, it is not entirely desirable to log a borehole with an investigating device having a plurality of borehole wall-engaging pad members due to the mechanical bulkiness and complication of the downhole equipment. Moreover, if the borehole is filled with a relatively nonconductive drilling mud, such as an oil base drilling mud, the pad mounted electrodes must make good contact with the formations surrounding the borehole to obtain valid measurements.

Another way of measuring the dip of formation bedding planes is to utilize the so-called "induction logging" type of exploring device. By so doing, a nonconductive mud column will not adversely affect the operation of the system. Also, it is possible to centrally locate the induction coils thus eliminating the necessity for borehole wall-engaging pad members. One such system for determining the dip of formation bedding planes by induction techniques is shown in U.S. Pat. No. 3,187,252 granted to E. T. Hungerford on June 1, 1965. The Hungerford system utilizes a plurality of spaced apart and perpendicularly aligned induction coils. A plurality of transmitter coils are energized with an alternating current so as to induce eddy currents in the formations. The magnetic flux produced by such secondary current then induces currents in a plurality of spaced apart receiver coils. The magnitude of these currents induced into the receiver coils will be a function of the earth formation conductivity as well as the geometry of the coil array. The entire coil array is then rotated at a constant frequency to produce modulation components in the receiver coil signals at the frequency of rotation of the coil array. These modulation components are then mathematically combined to give the azimuth and dip angle of formation bedding planes.

However, there are several problems inherent in a system of the type disclosed in the Hungerford patent. One such problem is that the determination of dip depends on the absolute value of the resistivity or conductivity of the earth formations, which has nothing to do with the azimuth or angle of dip. Moreover, when the various transmitter and receiver coils are spaced apart from one another, there are severe problems resulting from the mutual coupling between the various coils. In addition to this, the mud column itself, which is usually relatively conductive, will cause spurious signals to be picked up by the receiver coils thus tending to introduce errors into the determination of dip.

It is therefore an object of the present invention to provide new and improved methods and apparatus for investigating earth formations traversed by a borehole.

It is an additional object of the present invention to provide new and improved methods and apparatus for determining the positioning of formation bedding planes while avoiding the above problems of the prior art.

In accordance with the present invention, methods and apparatus for investigating earth formations comprises producing an electromagnetic field in a formation and rotating this field around a borehole to produce a signal having a modulation component representative of conductivity variations around a borehole. The effective axis of rotation of this field is then brought into a substantially perpendicular direction in response to the modulation component of the signal. By so doing, the positioning of this formation plane can be determined without relying on the absolute formation resistivity. Desirably, the measurements are made by a self inductance technique to thus eliminate the necessity of spaced apart transmitter and receiver coils.

In one form of the invention, the rotating field is produced by rotating or spinning an induction coil about an axis whose positioning can be adjusted. The coil can then be energized with current at a frequency greater than the frequency of rotation of the coil to produce an amplitude modulated signal. The modulation component of this amplitude modulated signal can then be used to position the axis of the rotating coil to null the modulation component. The positioning of this axis will then indicate the positioning of a formation bedding plane.

In another form of the present invention, rotating electromagnetic fields are produced at two spaced apart depth levels in a borehole by sequentially energizing a plurality of circumferentially spaced coils located at the spaced apart depth levels. The signals resulting from the two spaced apart rotating magnetic fields are then combined with an adjustable weighting factor which is dependent upon the conductivity contrast at the two depth levels for each circumferential position. By so doing, a field rotating about an effective axis which is substantially perpendicular to a formation bedding plane is simulated. The positioning of this plane can then be determined.

For a better understanding of the present invention, together with other and further objects thereof, reference is had to the following description taken in connection with the accompanying drawings, the scope of the invention being pointed out in the appended claims.

Referring to the drawings:

FIG. 2 is a diagrammatic perspective view representing the mechanical portion of one embodiment of the present invention;

FIG. 3 shows the electrical circuits associated with the mechanical device illustrated in FIG. 2;

FIGS. 4A, 4B and 4C represent a portion of the downhole exploring device of FIG. 2 in various borehole situations for purposes of explaining the operation of the FIGS. 2 and 3 apparatus;

FIGS. 5A–5D show voltage waveform diagrams useful in explaining the operation of the FIGS. 2 and 3 embodiment of the present invention;

FIG. 6 is a diagrammatic view of two planes in space for purposes of explaining the operation of the FIGS. 2 and 3 embodiment of the present invention;

Figure 9:
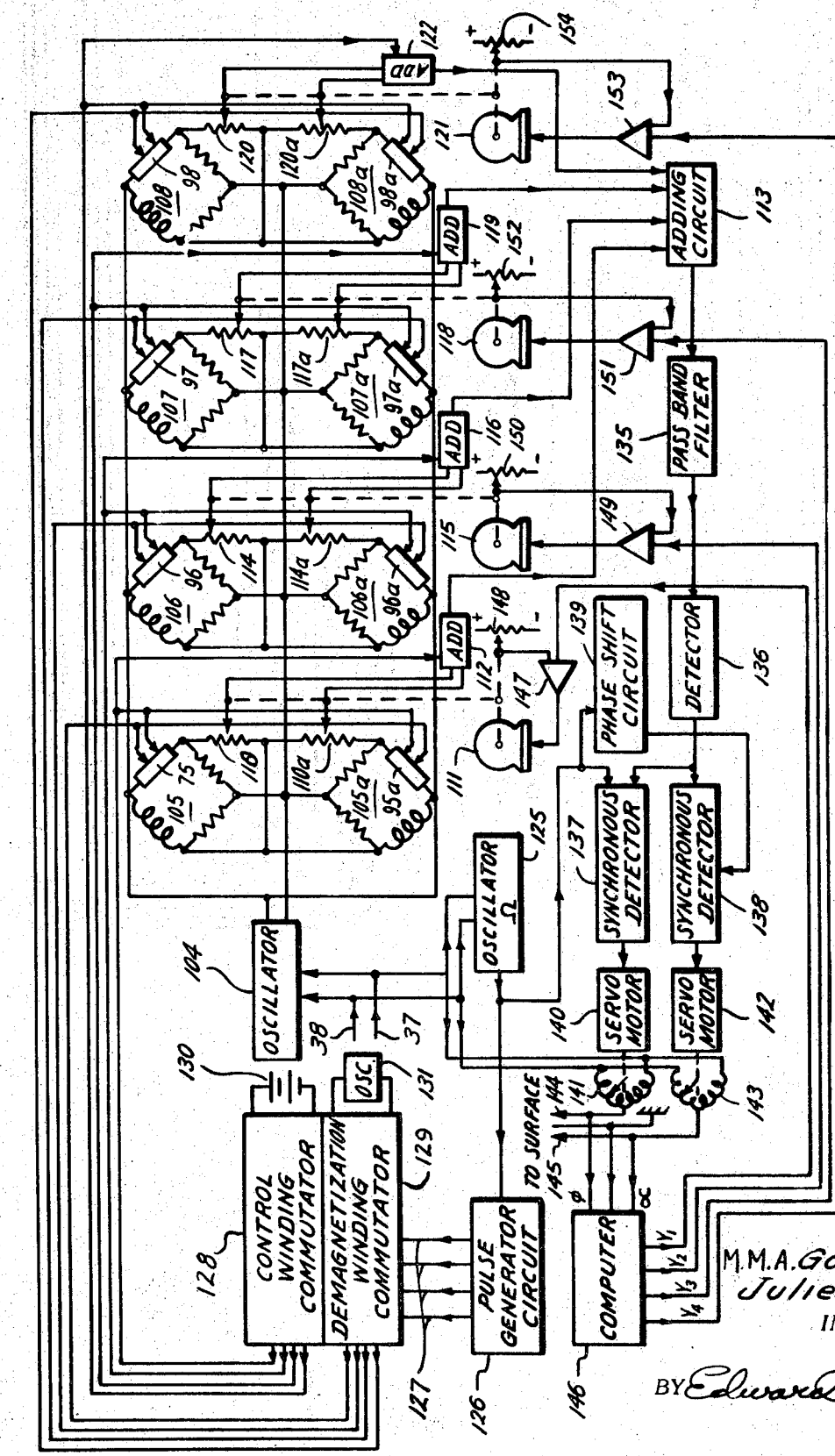
FIG. 9 illustrates the electrical circuits associated with the apparatus of FIGS. 7 and 8.

FIGS. 10A–10H–I illustrate a voltage timing diagram useful in explaining the operation of the FIG. 9 circuitry;

FIG. 11 illustrates two non-parallel planes in space along with vectorial representations of certain measured parameters for purposes of explaining the operation of the second embodiment of the present invention; and FIGS. 12A–12C–D show voltage waveform diagrams that could be expected at various points in the FIG. 9 electrical circuitry for purposes of explaining how the electrical circuitry of FIG. 9 performs the operation depicted in FIG. 11.

Figure 1:
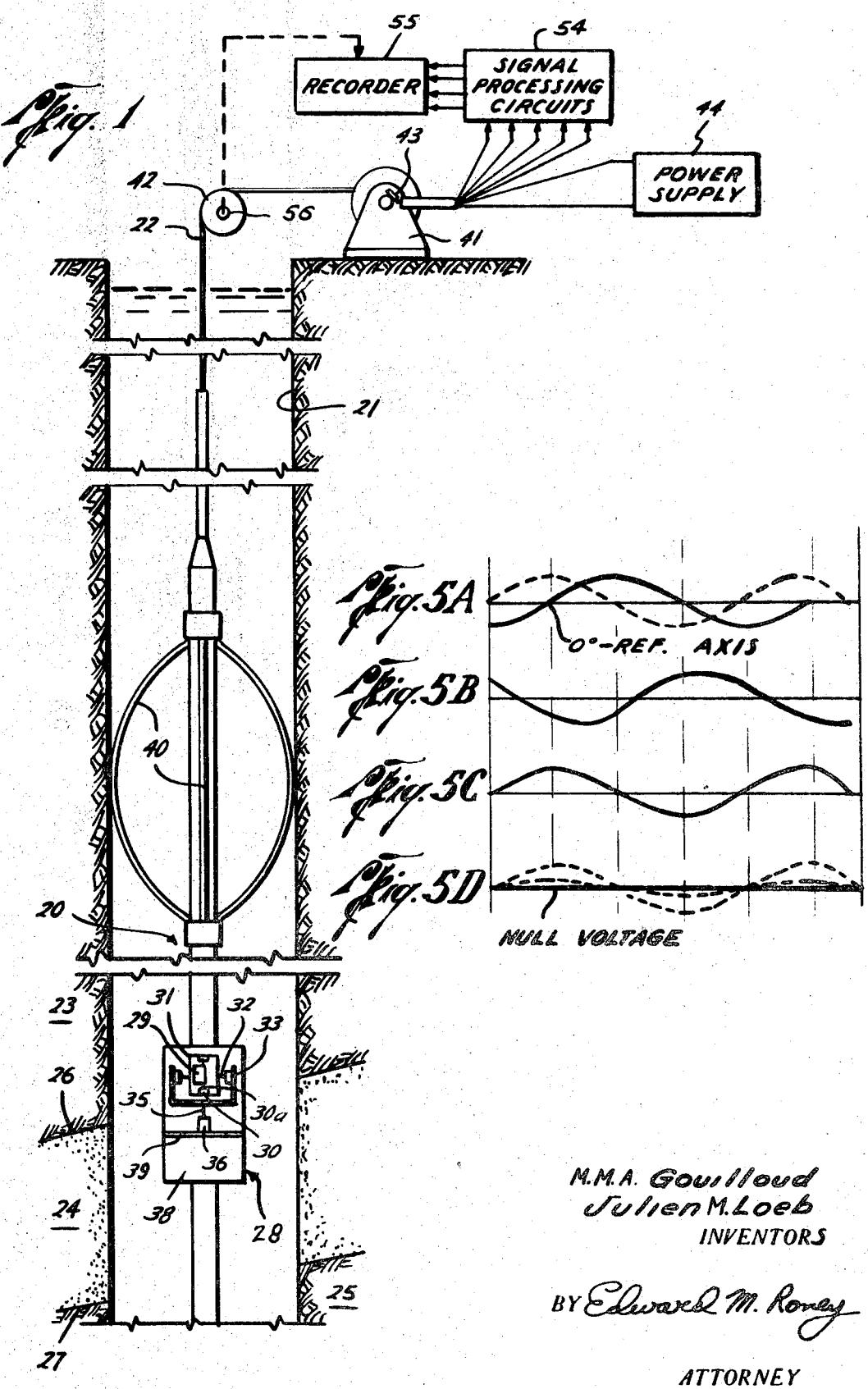
FIG. 1 is a diagrammatic view of the investigating apparatus of the present invention located in a borehole drilled into the earth.

Referring now to FIG. 1, there is shown a longitudinally extending investigating apparatus 20 lowered into a borehole 21 on the end of an armored multiconductor cable 22 for determining the positioning of formation bedding planes. As an example, there are shown a plurality of formations designated 23, 24 and 25 having a boundary 26 between the formations 23 and 24 and boundary 27 between the formations 24 and 25. The investigating apparatus 20 includes an exploring instrument 28 which includes a coil 29 which is desirably eccentrically mounted on a shaft 30a rotated by a synchronous motor 30. The entire assembly of the coil 29 and motor 30 is supported by a rectangular member 31 which is supported by a shaft 32 rotated by a servomotor 33. This entire assembly, just described, is supported by a U-shaped member 34 supported by a shaft 35. The shaft 35 is driven by a servomotor 36 fixed to a base plate 39. This entire assembly will be shown and described in greater detail in FIG. 2.

The exploring instrument 28 also includes a compartment 38 for housing a suitable compass and inclinometer device (not shown) for indicating the inclination of the investigating apparatus 20 relative to magnetic north. To keep the investigating apparatus 20 centered in the borehole, a plurality of spacers 40 are provided.

At the surface of the earth, a suitable winch 41 is utilized to reel the cable 22 in or out of the borehole over a suitable grooved pulley wheel 42. A commutator 43 electrically connects a power supply 44 with the electrical circuitry in the downhole investigating apparatus 20 and likewise receives the measurement signals from the downhole apparatus for application to suitable signal processing circuits 54. These circuits operate to, among other things, reference the measurement signals to a common reference potential as well as to provide suitable gain control, etc. The output signals from the signal processing circuits 54 are supplied to a recorder 55 for making a record of the measurements, the recorder 55 being driven as a function of the movement of the downhole apparatus 20 through the action of a suitable shaft 56 attached to the pulley 42.

Figure 2:
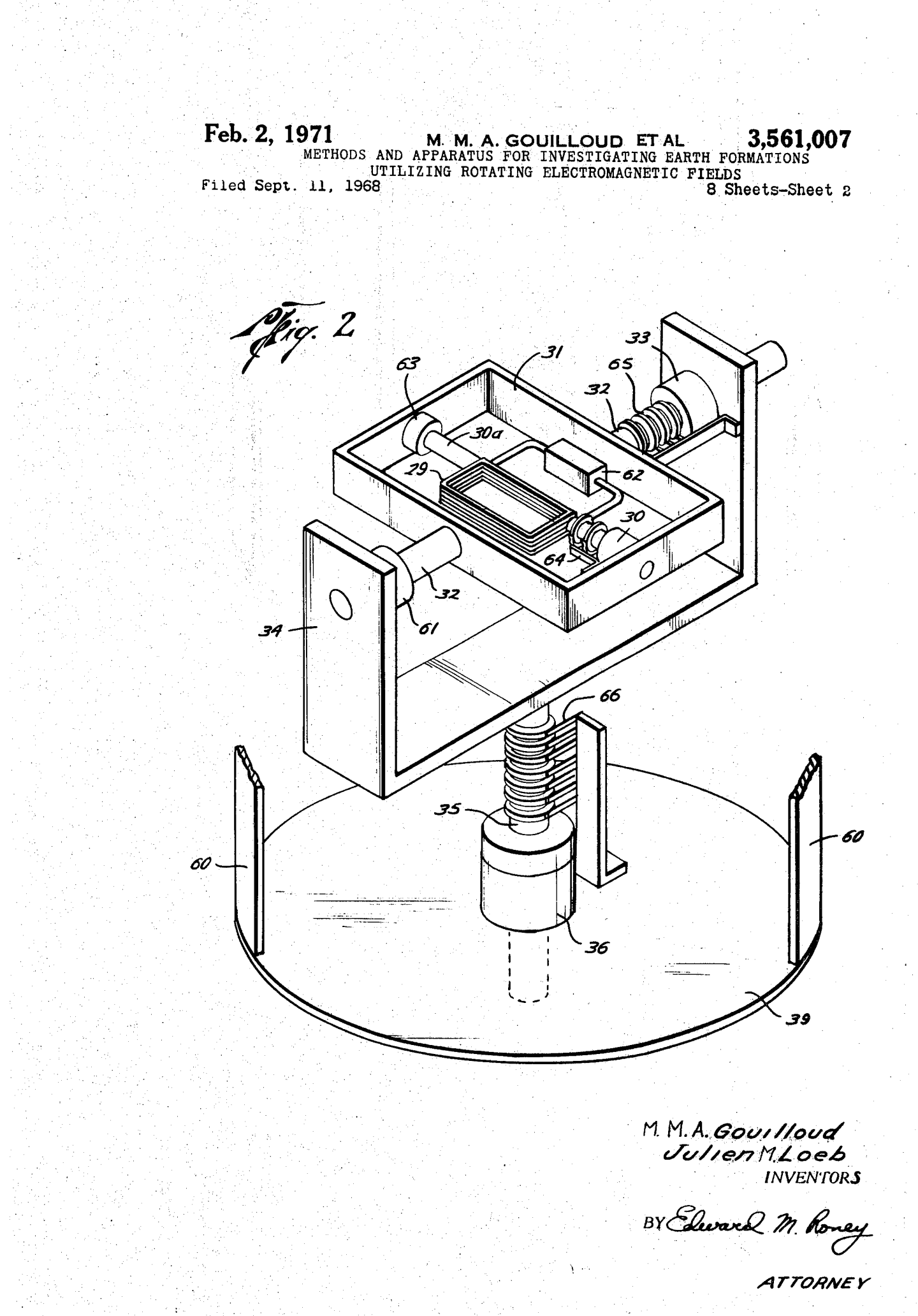

Now referring to FIG. 2, there is shown in greater detail the mechanical apparatus contained within the housing 28 of FIG. 1. The base plate 39 is fixed to the investigating apparatus 20 by suitable mounting brackets 60. The motor 36 armature shaft 35 supports the U-shaped member 34 for rotation about an axis defined by the shaft 35. The vertical portions of the member 34 support the shaft 32 which is perpendicular to the shaft 35. The shaft 32 is rotated by the motor 33, the rotatable shaft 32 supporting the rectangular member 31 for rotation about the axis defined by the shaft 32. The rectangular member 31 supports the shaft 30a which is disposed perpendicularly to the shaft 32. The shaft 32 supports an eccentrically mounted induction coil 29 as well as a counter-balancing weight 62. Counter-weights 61 and 63 are disposed on opposite ends of the shafts 32 and 30a from the motors 33 and 30 respectively. Power is supplied to the motors 30, 33 and 36 by way of slip ring assemblies 64, 65 and 66 respectively. By the foregoing mechanical arrangement, it can be seen that the coil 29 will be rotated or spinned at an essentially constant speed by the synchronous motor 30 when it is supplied with power. The coil 29 can be aligned in any given direction through the operation of the servomotors 33 and 36 with the servomotor 36 rotating the assembly 34 to any desired azimuthal direction and the motor 33 dipping the rectangular member 31 to any desired angle of inclination.

Now referring to FIG. 3, there is shown the electrical circuitry to be utilized in conjunction with the mechanical arrangement of FIG. 2. Power is supplied over the cable 22 by way of a pair of conductors 70 and 71 to the various circuits located in the investigating apparatus 20. A sinusoidal oscillator 72 operating at an angular frequency $\omega$ energizes a bridge circuit 73 which includes the induction coil 29, a balancing inductor 43 and two resistors 73a and 73b. A second sinusoidal oscillator 74 operating at an angular frequency $\Omega$ which is substantially lower than the frequency $\omega$, energizes the synchronous motor 30 by way of an adjustable phase shift circuit 75 such that the rotating coil 29 will rotate at an angular frequency of $\Omega$. The interaction of the eddy currents induced in the formation with the electromagnetic field of the coil 29 yields amplitude modulation of the coil energizing current.

The resulting measure signal from the bridge circuit 73 is picked off of the opposite diagonal from which the energizing current at frequency $\omega$ is supplied. This measure signal is passed to a suitable band pass filter tuned to the angular frequency $\omega$ but which has a band width sufficient to pass the upper and lower side band frequencies $\omega+\Omega$ and $\omega-\Omega$. The output signal from band pass filter 76 is then passed to a suitable envelope detector 77 which detects the modulation component of the amplitude modulated measure signal. The detected signal from the envelope detector 77 is supplied to a pair of synchronous or phase-sensitive detectors 78 and 79 which receive reference signals at the angular frequency $\Omega$. The synchronous detector 79 receives its reference signal directly from the oscillator 74 and the synchronous detector 78 receives a phase-quadrature signal from the oscillator 74, the quadrature phase shift being provided by a suitable phase shift network 80. The reason for driving the synchronous detectors 78 and 79 with in-phase and phase-quadrature reference signals will be explained later.

The output signal from the synchronous detector 79 will thus take the form of a DC signal proportional to that portion of the detected signal from the envelope detector 77 which is in-phase with the reference signal from oscillator 74. This in-phase component is utilized to drive a servomotor 36 whose armature shaft 35 (see FIG. 2) rotates the U-shaped member 34 until the output signal from synchronous detector 79 nulls. (i.e., goes to zero volts.) Likewise, the output signal from synchronous detector 78 is a varying DC signal proportional to that portion of the detected signal from envelope detector 77 which is in phase-quadrature with the signal from the oscillator 74. This detected phase-quadrature component is utilized to drive the servomotor 33 for rotating the shaft 32 of FIG. 2. Thus, the shaft 32 and coil assembly carried thereby will be rotated by the motor 33 until a null condition is achieved, i.e., the output of synchronous detector 78 goes to zero volts.

To obtain a better understanding of the various angles discussed herein, refer to FIG. 6 where there is shown a circular plane 90, designated the device reference plane, which is parallel to the platform 39 of FIG. 2. The axis projecting out of the plane 90 and perpendicularly thereto is designated the "Z" axis. Additionally, there is an axis in the plane 90 designated the "reference axis." A typical formation bedding plane 91 makes some angle $\alpha$ with the device reference plane 90 (as measured by the angle between the Z axis and a Z' axis projecting from the plane 91 and perpendicular thereto). A vector 92 represents the strike (i.e., a line in plane 91 aligned with the direction of maximum tilt) of this dipping formation bedding plane 91. The projection of this vector 92 on the reference plane 90 produces a vector component 93 which is separated by the relative dip angle $\alpha$ from the vector 92 and the relative azimuth angle $\phi$ from the reference axis. These angles $\phi$ and $\alpha$ are relative angles, i.e., they are relative to the gravitational axis and magnetic north which are measured by other instruments (not shown).

To better understand how modulation of the coil current at frequency $\omega$ is produced, refer to FIG. 4A where there is shown two formation beds having conductivities $\sigma_1$ and $\sigma_2$ separated by a boundary 26 which cuts a borehole 21 at a given angle $\alpha$. In this FIG. 4 situation, it is assumed that the shaft 30a is aligned with the borehole axis so that the coil 29 will be at the diagonal positions A and B at different times during its revolution around the axis 30a. It can be seen that when the coil 29 is in the position A, it is coupled primarily with the formation of conductivity $\sigma_1$ so that the self inductance of the coil 29 in this position A will be reflecting the conductivity $\sigma_1$. On the other hand, when the coil 29 has rotated to the position B, it can be seen that it is coupled primarily with the formation of conductivity $\sigma_2$. Assuming then that the conductivities $\sigma_1$ and $\sigma_2$ are different from one another, the energizing current at frequency $\omega$ will be modulated at a rate depending on the frequency of rotation of the coil 29 and at an amplitude depending on the conductivity contrast of $\sigma_1$ to $\sigma_2$. Referring to FIG. 5B, there is shown an example of the resulting modulation to the energizing current at frequency $\Omega$.

To accurately determine the dip and azimuth of the boundary plane 81, this modulated signal is compared in phase with the current which drives the motor 30, which is represented as the solid line waveform in FIG. 5A. Since the rotating coil motor 30 is a synchronous motor, the armature shaft 30a, and thus the positioning of the coil 29, will be synchronous at all times with the phase of the energizing current shown in FIG. 5A. This, then, provides the necessary phase versus position synchronization for the system to operate. To insure that the rotating coil 29 is initially set at a proper reference position, the adjustable phase shift circuit 75 can be utilized or alternatively, the coil 29 could be rotated to the proper position by hand. In any event, the reference axis of FIG. 6 corresponds to a given phase of the oscillator 74 current, as for example, 0°.

The modulation signal of FIG. 5B is then synchronously detected by the reference signals of FIG. 5A to energize the motors 33 and 36 so as to bring the axis of rotation of the rotating coil 29 to a position such that this modulation signal of FIG. 5B will be substantially reduced to zero volts. Upon this occurrence, the axis of the shaft 30a (and thus the axis of rotation of the coil 29) will be aligned perpendicular to the bedding plane, as better represented in FIG. 4B. In FIG. 4B, the axis of the shaft 30a is shown perpendicular to the boundary plane 26 between the formation beds of conductivity $\sigma_1$ and $\sigma_2$ such that the coil 29 will take positions C and D in the course of its rotation around the axis 30a. It can be seen from FIG. 4B that when the coil 29 rotates about this axis 30a, the coupling of the coil 29 with the formations will be the same for every angular position of its rotation about the axis 30a provided the investigating apparatus is centered in the borehole. Since the coil energizing current at frequency $\omega$ is not modulated in this case, the output signal from the envelope detector 77 will be at zero volts and thus the motors 33 and 36 will remain stationary.

To provide an indication of the positioning of the coil, the armature shafts from the servomotors 33 and 36 drive the wiper arms 82 and 83 of a pair of potentiometers 84 and 85 respectively. The potentiometers are energized by power from the cable conductors 70 and 71 so that the voltage level on the wiper arms 82 and 83 are proportional to the amount that the servomotors 33 and 36 have turned the shafts 32 and 35 of FIG. 2 from some reference position. Since the servomotor 36 rotates the U-shaped member 34 about the investigating apparatus 20 axis (and thus about the borehole axis if the apparatus 20 is centered therein), the voltage on the wiper arm 83 will be proportional to the relative azimuth angle of the dipping formation bedding plane. The servomotor 33 on the other hand rotates the rectangular member 31 about the shaft axis 32 so that the voltage on the wiper arm 82 of potentiometer 84 is proportional to the relative dip angle $\alpha$ of the formation bedding plane 26 relative to the plane defined by the platform 39 of FIG. 2 (and thus with reference to the device reference plane which is perpendicular to the axis of the investigating apparatus 20). These signals from wiper arms 83 and 82 are amplified by amplifiers 86 and 87 for transmission to the surface of the earth. The output signals from amplifiers 86 and 87 are referred to the reference potential on a conductor 88.

When the rotational axis of the coil 29 is aligned in a non-parallel direction with the borehole axis, the rotating coil 29 will define an eccentric path around the borehole as represented in FIG. 4C. (FIG. 4C is a top view of FIG. 4B aligned with and looking down on the shaft 30a.) It can be seen in FIG. 4C that the coil 29 is coupled with the greatest dimension of the borehole in two separate positions E and F so as to produce maximum amplitude excursions of the coil current at two separate positions in each cycle of revolution around the borehole. Because of this, a spurious modulation component at angular frequency $2\Omega$ will be present in the amplitude modulated signal output from bridge circuit 73. However, the synchronous detectors 78 and 79, being responsive only to the angular frequency $\Omega$, will effectively filter out this spurious $2\Omega$ signal. If desired, the band pass filter 75 could be tuned to one of the side band frequencies $\omega+\Omega$ or $\omega-\Omega$ with a sufficiently narrow band width to eliminate the $\omega+2\Omega$ and $\omega-2\Omega$ side band frequencies.

Now referring to FIGS. 2, 3, 4A, 4B, 4C and 6 in conjunction, a step by step description of a theoretically possible operation of the FIGS. 2 and 3 embodiment of the present invention will be given.

It will be assumed for purposes of explanation that the platform 39 is initially in a horizontal position perpendicular to the axis of the investigating apparatus 20. It will furthermore be assumed that the servomotor 33 is initially inoperative, as by breaking the conductor between the synchronous detector 78 and the servomotor 33, so that only the servomotor 36 is operative. Then, as the coil 29 rotates in response to the oscillator 74 signal of FIG. 5A, a modulation signal such as shown in FIG. 5B will be produced at the output of the envelope detector 77. The synchronous detector 79 then acts to detect that portion of the modulation signal which is in-phase with the "in-phase" signal from oscillator 74. The resulting signal from the synchronous detector 79 causes the servomotor 36 to rotate the U-shaped member 34 of FIG. 2 until this in-phase component of the modulation signal nulls or reduces to zero volts. This condition occurs when the modulation signal output from envelope detector 77 becomes 90° out of phase with the "in-phase" reference signal applied to synchronous detector 79, as represented by the waveform in FIG. 5C.

The rotation of the U-shaped member 34 corresponds to rotating the reference axis of FIG. 6 an angle $\phi$ until the reference axis lines up with the vector component 93 since, at this position, the only modulation of the coil 29 energizing current will be 90° out of phase with the oscillator 74 signal. At the same time, the wiper arm 83 of circular potentiometer 85 would have also rotated an amount proportional to the angle $\phi$ so as to provide an indication at the surface of the earth of the amount of this rotation.

Now assume that the synchronous detector 78 is reconnected to the servomotor 33. Since the U-shaped member 34 has been rotated to a point where the modulation signal is in-phase-quadrature with the oscillator 74 reference signal, the synchronous detector 78 will energize the servomotor 33 for rotating the shaft 32 until this phase quadrature modulation signal of FIG. 5C is also reduced to zero. Thus, the shaft 32 is rotated to tilt the axis of rotation of the coil 29 thus decreasing the amplitude of the modulation signal of FIG. 5D until the null (or no modulation) condition of FIG. 4B prevails. At this time, the modulation signal will go to zero volts as represented by the "null voltage" waveform in FIG. 5D. In FIG. 6, this nulling operation can be depicted by tilting the reference plane an angle $\alpha$ until the vector 92 lines up with the vector 93. The amount of rotation of the shaft 32 is indicated by the signal picked up by the wiper arm 82 of potentiometer 84 to provide an indication of the angle $\alpha$ at the surface of the earth.

Knowing the relative azimuth and dip angles $\phi$ and $\alpha$, it is only necessary to combine these two angles with measurements of the angle $\theta$ that the reference axis makes with magnetic north and the tilt angle $\beta$ of the investigating apparatus with respect to the gravitational axis (i.e., true vertical), in order to provide indications of the azimuth and dip of the formation bedding plane relative to magnetic north and the true horizontal direction (i.e., relative to a plane perpendicular to the gravitational axis G).

Figure 7:
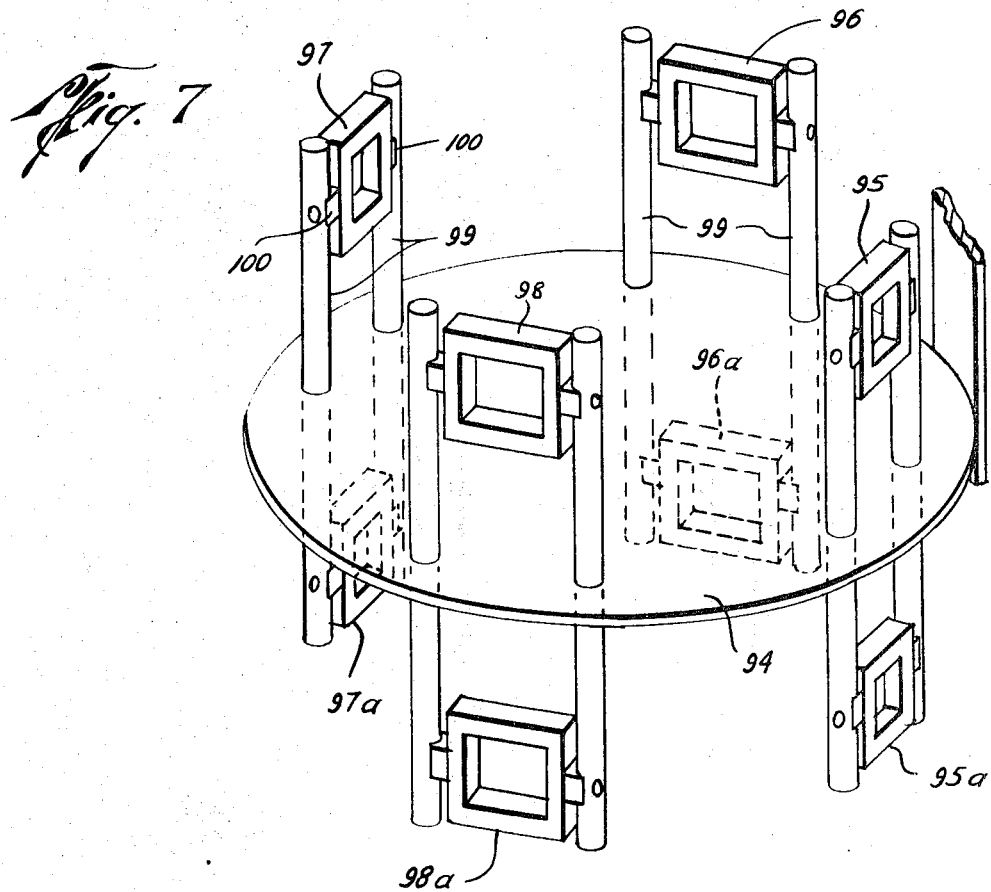
FIG. 7 is a perspective diagrammatic view of the mechanical layout of a plurality of magnetic cores in accordance with a second embodiment of the present invention.

Now referring to FIG. 7, there is shown another embodiment of the present invention. In this FIG. 7 embodiment, a plurality of saturable magnetic cores 95, 96, 97 and 98 are mounted on a plurality of insulating members 99 a fixed distance above a stationary platform 94 which is mounted in the investigating apparatus. At the same fixed distance below the platform 94 and directly below the upper cores, a plurality of magnetic cores 95a, 96a, 97a and 98a are likewise mounted on the members 99.

Figure 8:
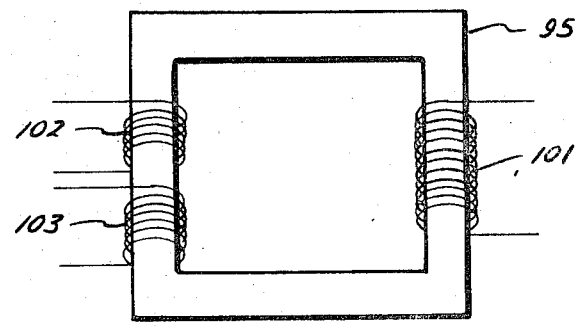
FIG. 8 illustrates how the magnetic cores of FIG. 7 coud be wound in a desirable manner to produce electromagnetic fields in a formation in accordance with the operation of this second embodiment.

Referring to FIG. 8, there is shown an illustration of how the various coil windings are wrapped around the magnetic cores. Using the core 95 as exemplary, an energization coil 101 is wrapped around one vertically disposed leg of the core 95 so that the axis of the coil 101 will be parallel to the longitudinal axis of the investigating apparatus. A control winding 102 is wrapped around another leg of the core 95 and is periodically excited with a DC current for magnetically saturating the core 95 so that the magnetic flux produced by the coil 101 will couple with the adjoining formation. When the coil 102 is un-energized, the magnetic flux produced by the coil 101 will pass through the magnetic core 95 thus de-coupling the coil 101 from the surrounding formation. A third coil 103 is wrapped around one leg of the core 95 and is utilized for demagnetizing the magnetic core 95 at the proper time. The other cores are wound in a similar manner.

Referring now to FIG. 9, there is shown the electrical circuitry utilized in accordance with this second embodiment of the present invention. An oscillator 104 operating at an angular frequency $\omega$ energizes the windingss 101 (FIG. 8) associated with each magnetic core 95-98 and 95a-98a. The energization winding 101 for each of these magnetic cores 95-98 and 95a-98a is connected into individual bridge circuits 105-108 and 105a-108a respectively. These bridge circuits are constructed in the same manner as bridge circuit 73 in FIG. 3. A fraction of the output signal from each bridge circuit is present at the wiper arms of a plurality of potentiometers. The wiper arms associated with each pair of cores (i.e., a pair constitutes the upper and lower cores at a given circumferential location on the platform 94) are mechanically ganged together.

Taking the bridge circuits 105 and 105a as exemplary, potentiometers 110 and 110a are connected across the opposite diagonals of the bridge circuits 105 and 105a from which the oscillator 104 current is supplied. One end of the resistance portion of each potentiometer 110 and 110a is then shorted together and the wiper arms of each potentiometer 110 and 110a are mechanically ganged together and driven by a motor 111. The voltages picked up by the wiper arms of potentiometers 110 and 110a are supplied to the input of a summing amplifier 112 whose output is supplied to the input of a combining circuit 113. The bridge circuits 105 and 105a are connected in an opposite polarity fashion to the oscillator 104 so that the signals on the wiper arms of potentiometers 110 and 110a will be of opposite polarity. Thus, if $x$ is the positioning of the wiper arm of potentiometer 110 and $e_1$ and $e_2$ are the signals derived from the bridge circuits 105 and 105a, the output signal from summing amplifier 112 will be proportional to $x_1e_1+(1-x_1)e_2$.

In like fashion, potentiometers 114 and 114a are similarly connected in the bridge circuits 106 and 106a with a motor 115 driving the wiper arms thereof in a ganged fashion. The voltages picked up by the wiper arms of potentiometers 114 and 114a are then supplied to a summing amplifier 116 whose output signal is also supplied to the combining network 113. The potentiometers 117 and 117a, servomotor 118 and summing amplifier 119 are likewise associated with the bridge circuits 107 and 107a as are the potentiometers 120 and 120a, servomotor 121, and summing amplifier 122 associated with the bridge circuits 108 and 108a.

A second oscillator 125 operating at an angular frequency Ω supplies its output signal to a pulse generating circuit 126 which acts to generate four separate pulses on four separate conductors 127 at intervals of π/2Ω apart and lasting a time interval of up to π/2Ω. Thus, the circuit 126 is responsive to the 0°, 90°, 180°, and 270° phase points of the oscillator 125 output signal corresponding to time equals 0, π/2Ω, π/Ω, and 3π/2Ω for generating these pulses. These control pulses from pulse generating circuit 126 are supplied to a control winding commutator 128 and demagnetization winding commutator 129. The control winding commutator 128 is responsive to a DC current from a battery 130 for periodically saturating each pair of magnetic cores of FIG. 7 to sequentially couple the energization windings 101 associated with each pair of cores with the formation adjoining the borehole. By this means, the coils associated with each pair of magnetic cores will in turn be coupled with the formation at a given circumferential direction around the borehole so as to simulate a rotating magnetic field in the same manner as accomplished mechanically with the FIG. 2 apparatus.

Immediately after the energization windings 101 of each pair of magnetic cores is de-coupled from the formation, the demagnetization winding commutator 129 connects an oscillator 131 to the demagnetization winding 103 associated with the pair of magnetic cores which has just been de-coupled from the formation. A suitable variable impedance device whose impedance varies with time can be incorporated in the oscillator 131 so that the magnitude of the demagnetization signal will decrease with time.

Figure 10:
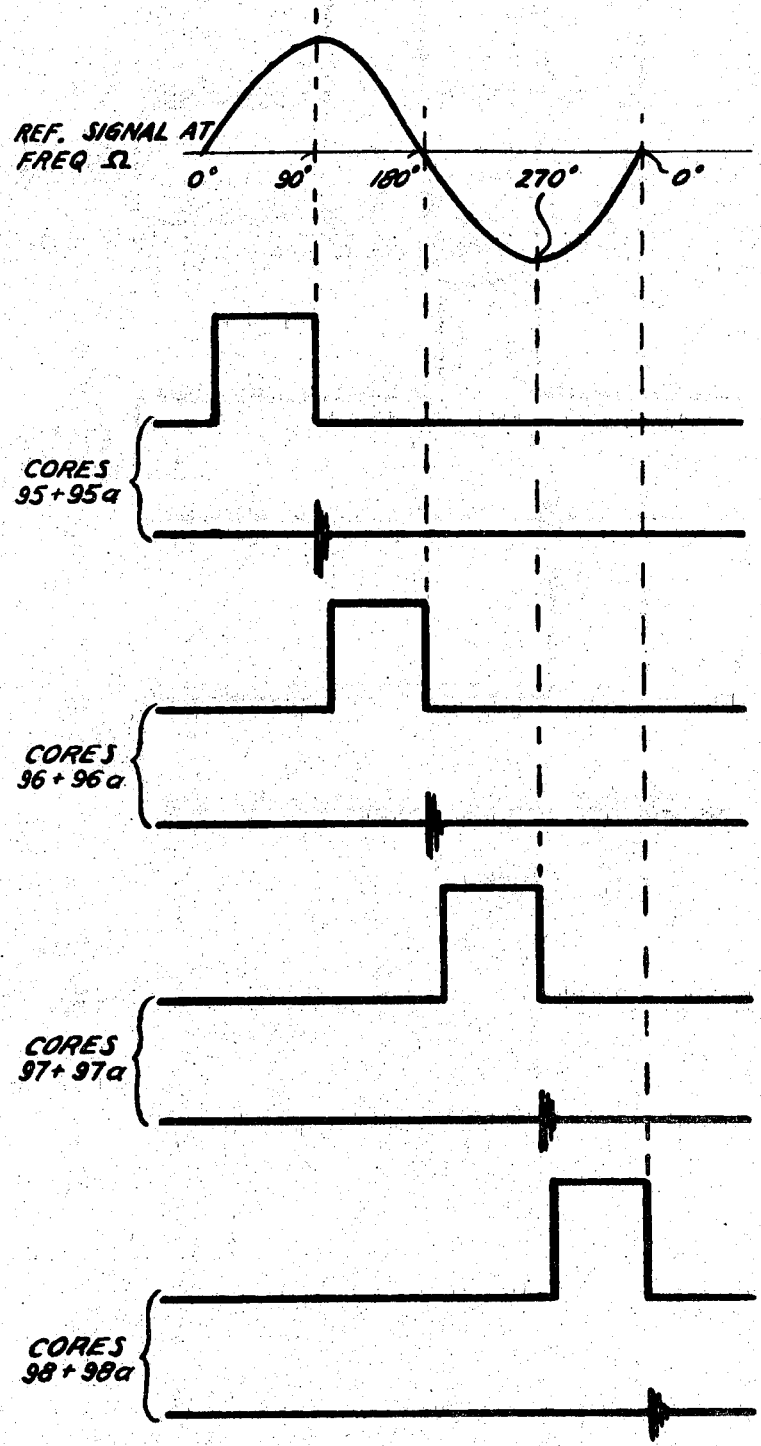

Referring now to FIG. 10, there is shown a waveform timing diagram to illustrate how this sequential operation takes place. FIG. 10A illustrates the reference signal at angular frequency Ω from oscillator 125 from which the control winding signals of FIGS. 10B, 10D, 10F and 10H are generated for application to the control windings 102 associated with each pair of cores. Immediately after the termination of these control signals, the demagnetization signals of FIGS. 10C, 10E, 10G and 10I are generated for application to the demagnetization windings 103 associated with each pair of magnetic cores. The generation of these demagnetization signals could be suitably provided by, for example, energizing a one-shot in response to the trailing edge of each control pulse so as to pass the demagnetization signals to the proper winding.

Alternatively, if desired, the output pulses from the pulse generating circuit 126 could be utilized to switch the current from oscillator 104 to each one of the energization windings 101 of each pair of cores in sequence, thus eliminating the need for the control windings 102. Also, the saturable cores could be eliminated, thus eliminating the need for the demagnetization windings 103.

Since the energization windings 101 associated with each pair of cores are energized at the angular frequency ω via oscillator 104 and each pair of cores is effectively sampled in sequence at the angular frequency Ω, it is clear that the output of the combining network 113 will be an amplitude modulated signal having a carrier frequency ω/2π cycles/second and a modulation frequency Ω/2π cycles/second. Additionally, as in the FIGS. 2 and 3 embodiment, there is a spurious modulation component at the angular frequency 2Ω radians/second (or Ω/π cycles/second). The amplitude modulated signal from combining network 113 is then supplied to a suitable band pass filter 135 which is tuned to the carrier frequency ω/2π and has a band width sufficient to pass both the upper and lower side band frequencies. This signal is then demodulated by a suitable envelope detector 136 and the resulting modulation signal is applied to a pair of synchronous detectors 137 and 138. The reference signal for the synchronous detector 137 is the in-phase signal from oscillator 125 and the phase reference signal for the synchronous detector 138 is the phase-quadrature signal at the angular frequency Ω derived from a phase shift circuit 139.

The output signal from phase-sensitive detector 137 is thus a DC signal proportional to that portion of the modulation signal which is in-phase with the oscillator 125 reference signal and is utilized to drive a servomotor 140 whose armature shaft drives the wiper arm of a potentiometer 141. In like fashion, the output signal from synchronous detector 138 is a DC signal proportional to that portion of the modulation signal which is in phase-quadrature with the oscillator 125 reference signal. This detected phase-quadrature component is utilized to drive a servomotor 142 whose armature shaft drives the wiper arm of a potentiometer 143. The voltages derived from the wiper arms of the potentiometers 141 and 143 are proportional to the relative azimuth angle φ and the relative dip angle α and are applied to a pair of amplifiers 144 and 145 for transmission to the surface of the earth. These transmitted signals are then used along with measurements of the relative bearing angle θ and the inclination angle β to provide indications of the true azimuth and dip angle of a formation bedding plane.

These φ and α signals are also applied to a computer 146 which generates four output signals $y_1$, $y_2$, $y_3$ and $y_4$ where $y_1$=tan α cos φ, $y_2$=tan α sin φ, $y_3$=—tan α cos φ, and $y_4$=—tan α sin φ. The signal $y_1$ is supplied to one input of an amplifier 147, the other input thereto being derived from the wiper arm of a potentiometer 148 which is energized by symmetrical DC voltages having amplitudes proportional to the extreme anticipated positive and negative values of tan α. (These extreme values are $$\tan \alpha = \frac{D}{R}$$

where D is the vertical separation between the platform 94 and coil 101 and R is the radial distance from the center of the platform 94 to the projection of the coils 101 onto the platform 94.) The output of the operational amplifier 147 drives the motor 111 whose output shaft, along with moving the ganged wiper arms of potentiometers 110 and 110a, also drives the wiper arm of potentiometer 148. The gain of amplifier 147 is sufficiently high that the input voltages thereto will remain substantially equal and thus the positions of the wiper arms of potentiometers 110 and 110a and 148 will be representative of the magnitude of $y_1$.

In a similar fashion, an amplifier 149 compares the signal $y_2$ with the wiper arm voltage of a potentiometer 150 for driving the servomotor 115 which in turn drives the wiper arms of potentiometers 114, 114a and 150. Likewise, the signal $y_3$ is supplied to an amplifier 151 for energizing the servomotor 118 to position the wiper arms of potentiometers 117, 117a, and 152 and the servomotor 118, an amplifier 153 and a potentiometer 154 are associated with the servomotor 121 to produce the same function in connection with the potentiometers 120 and 120a in response to the $y_4$ signal. The positioning of the wiper arms of the potentiometers corresponding to each core pair, in effect, simulates the positioning of a fictitious coil somewhere between the extreme elevations of the actual coils 101 of the upper and lower cores of each core pair. All four fictitious coils, then, will define the formation bedding plane.

To gain a better understanding of the operation of this second embodiment of the present invention, refer to FIGS. 7–12 in conjunction. First concerning FIG. 11, there is shown the platform 94 and another plane 160 representing a dipping bedding plane whose strike axis makes an angle α with the plane 94. There are also shown four vectors designated $\overline{M}_1$, $\overline{M}_2$, $\overline{M}_3$ and $\overline{M}_4$ which originate at the reference plane 94 and terminate at the bedding plane 160. These vectors are perpendicular to the reference plane 94. The positions of these four vectors $\overline{M}_1$, $\overline{M}_2$, $\overline{M}_3$ and $\overline{M}_4$ on the reference plane 94 correspond to the positioning of the magnetic core pairs 95–95a, 96–96a, 97–97a, and 98–98a respectively. Since the energization coils 101 are sequentially energized to simulate a rotating electromagnetic field, it is clear that the four vectors $\overline{M}_1$, $\overline{M}_2$, $\overline{M}_3$ and $\overline{M}_4$ will be sequentially sampled. If the position of the vector $\overline{M}_1$ is designated as the reference position when the reference signal of FIG. 10A is at the 0° phase position, the vector $\overline{M}_2$ will be sampled at the 90° phase position, the vector $\overline{M}_3$ at the 180° phase position, and the vector $\overline{M}_4$ at the 270° phase position.

As a starting point for discussion purposes, assume that the wiper arm of the potentiometers 141 and 143 are both held constant at a reference position indicating a plane perpendicular to the axis of the longitudinally extending support member and the wiper arms of all of the potentiometers connected with the bridge circuits are at centrally located positions corresponding to the fictitious coils being on the reference plane 94. In this case, it is clear that the output signal from each of the summing amplifiers 112, 116, 119 and 122 will be proportional to the difference in the coupling with the formations of the energization windings 101 associated with the upper and lower magnetic cores of each magnetic core pair. Thus, for example, the output voltage from summing amplifier 112 will be proportional to the difference in the coupling of the windings 101 associated with the cores 95 and 95a. The magnitude of these differences are represented by the length of the vectors $\overline{M}_1$–$\overline{M}_4$.

Now referring to FIGS. 12A and 12B in conjunction with FIG. 11, FIG. 12A illustrates the in-phase (solid line) and phase quadrature (dashed line) reference signals at angular frequency Ω from oscillator 125. The particular vector position $M_1$–$M_4$ which is sampled at any given time is illustrated above FIG. 12A by the designations $M_1$–$M_4$. Now referring to FIG. 12B, there are shown the vectors $\overline{M}_1$–$\overline{M}_4$ at the properly phased positions relative to FIG. 12A. The polarity and magnitude of these vectors corresponds to the modulation incurred by the oscillator 104 carrier signal. Therefore, the modulation signal output from the envelope detector 136 of FIG. 9 will take the form represented by the waveform 161 of FIG. 12B.

As the next step in the explanation of the operation of this embodiment of the present invention, assume that the wiper arm of the relative dip angle potentiometer 143 is held steady at a reference position corresponding to α=0° and only the wiper arm of the relative azimuth angle potentiometer 141 is allowed to move. In this event, the synchronous detector 137 of FIG. 9 will detect that portion of the modulation signal of FIG. 12B which is in-phase with the "in-phase" reference signal of FIG. 12A. The resulting DC output signal from detector 137 will drive the servomotor 140 to cause the potentiometer 141 to indicate some finite value for the relative azimuth angle $\phi$. The computer 146 is responsive to this change in $\phi$ for generating new values of $y_1$–$y_4$. These new values of $y_1$–$y_4$ cause the wiper arms of the potentiometers connected in the bridge circuits to be repositioned. The wiper arm of poentiometer 141 will go to whatever position is necessary to cause the output of synchronous detector 137 to null (or go to zero volts) and thus the modulation signal output from envelope detector 136 will change phase to become 90° out of phase with the in-phase reference signal (and thus in-phase with the phase-quadrature reference signal).

Now referring to FIG. 11, when the wiper arm of potentiometer 141 changes position to bring about this null condition, it can be said that the reference axis of FIG. 11 has effectively shifted an angle $\phi$ to line up with the new reference axis REF'. (The REF' axis is the projection of the strike axis on the reference plane.) In this event, the vector $\overline{M}_1$ will move an angle $\phi$ to the position represented by the vector $\overline{M}_1'$, the vector $\overline{M}_2$ will move to the position represented by the point $M_2'$, the vector $\overline{M}_3$ will move to the position represented by the vector $\overline{M}_3'$ and the vector $\overline{M}_4$ will move to the point $M_4'$. It should be noted that the coils themselves remain in their initial fixed positions but since the potentiometer 141 moves an angle $\phi$, this simulates the reference axis 94 moving an angle $\phi$.

Now, referring to FIG. 12C and drawing the vectors $M'_1$, $M_2'$, etc. in the proper positions relative to the in-phase reference signal of FIG. 12A, it can be seen that the waveform 162 can be traced in FIG. 12C. It should be noted that this waveform of FIG. 12C is in-phase-quadrature with the in-phase reference signal of FIG. 12A thus corresponding to the earlier discussion of the FIG. 9 operation.

Now that the reference axis of FIG. 11 has rotated an angle $\phi$, assume that the wiper arms of the potentiometer 143 is released so that the relative dip angle can be determined. Since the phase-quadrature reference signal of FIG. 12A is utilized to detect the modulation signal of FIG. 12C, the output signal from synchronous detector 138 will have some finite value so as to energize the servomotor 142 and rotate the wiper arm of potentiometer 143. The adjusted value of the relative dip angle α is then fed into the computer 146 to compute new values of $y_1$–$y_4$ which are utilized to again adjust the positions of the wiper arms of the various potentiometers until the output signal from synchronous detector 138 goes to zero volts. This process is depicted in FIG. 12D with the DC voltage 163 representing the modulation signal output from the envelope detector 136 upon the proper values of $\phi$ and α being computed. Thus, if vectors were drawn for the DC voltage 163 in FIG. 12D, it is clear that the vector at each point will be zero, thus indicating that the reference plane has lined up with the dipping plane, i.e., lined up in the sense that the wiper arms of potentiometers 141 and 143 have rotated to the proper positions so as to indicate the values of $\phi$ and α.

Summarizing the operation of this second embodiment of the present invention, the reference signal oscillator 125 causes the coils 101 associated with each pair of magnetic cores to be sequentially energized thus simulating a rotating magnetic field. The oscillator 104 then energizes these coils to produce an amplitude modulated signal output from combining circuit 113. After eliminating the carrier frequency, the resulting modulation signal is synchronously detected by the in-phase and phase-quadrature reference signals from oscillator 125. The in-phase and phase-quardature components of the modulation signal are used to adjust the potentiometers 141 and 143 to indicate the values of $\phi$ and α. The computer 146 then computes values of $y_1$–$y_4$ and the servomotors 111, 115, 118, and 121 are energized to position their associated wiper arms in proportion to $y_1$–$y_4$. The positioning of these wiper arms simulates the positioning of a rotating field defined by four fictitious coils, each coil lying with the range defined by the upper and lower coils 101 associated with each core pair. The position of these four fictitious coils then defines the positioning of the bedding plane. Thus, the simulated rotating field will rotate about an axis perpendicular to the bedding plane to produce the desired null condition. It should be noted here that since the null seeking system of both embodiments of the present invention seeks a formation plane which produces the least amount of modulation, it in effect seeks a formation plane having a lower resistivity or conductivity gradient than all other nearby formation planes. This low gradient plane is, then, the bedding plane.

Although, for explanation purposes, a step by step operation of the system was described, the system will continuously operate to define both the angles $\phi$ and α simultaneously. In this continuous operation, the output signal from combining network 113 can be expressed as $$(\sin \delta \sin \omega t \cos (\Omega t + \psi)) + A \sin \omega t$$

where δ and ψ are the relative dip angle and azimuth angle error components. If the gain and response time of the system are sufficiently high, δ and ψ will be substantially zero at all times.

It can thus be seen that the methods and apparatus of the present invention will continuously and accurately determine the azimuth and dip angle of formation bedding planes without the necessity of utilizing a plurality of bulky and expensive boreholes wall-engaging pad members. Furthermore, by utilizing only one measuring apparatus which can be centrally located in the borehole, it is not necessary to correlate a plurality of curves recorded on film. This then eliminates any errors which may arise due to differences in the velocity of the recorder and the downhole investigating apparatus. Furthermore, when utilizing the null seeking technique of the present invention, the actual resistivity or conductivity of the formations is not an influencing factor in determining the positioning of a formation bedding plane.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention. Thus, for example, instead of using electromechanical devices to position the fictitious coils of the second embodiment of the present invention, electronic circuits (integrators and multipliers) could be utilized.

What is claimed is:

1. Apparatus for investigating earth formations traversed by a borehole, comprising:
   (a) means for electromagnetically exploring a formation adjacent a borehole to produce a signal representative of the conductivity of such a formation, including means for producing an electromagnetic field in a formation;
   (b) means for rotating said electromagnetic field around a borehole to cause said signal to have a modulation component representative of conductivity variations around a borehole; and
   (c) means responsive to said modulation component for bringing the effective axis of said rotating electromagnetic field into a substantially perpendicular direction to a formation plane having a lower conductivity gradient than other nearby formation planes to thereby determine the positioning of such a formation plane.

2. Apparatus for investigating earth formations traversed by a borehole, comprising:
   (a) means for electromagnetically exploring a formation adjacent a borehole to produce a signal representative of the conductivity of such a formation, including means for producing an electromagnetic field in a formation;
   (b) means for rotating said electromagnetic field around a borehole to cause said signal to have a modulation component representative of conductivity variations around a borehole; and
   (c) means responsive to said modulation component for adjusting the effective axis of said rotating electromagnetic field until said modulation component has substantially the same magnitude for a plurality of circumferential directions around a borehole to thereby indicate the positioning of a formation plane having a lower conductivity gradient than other nearby formation planes.

3. Apparatus for investigating earth formations traversed by a borehole, comprising:
   (a) at least one induction coil adapted to be magnetically coupled with a formation;
   (b) means for energizing said at least one coil to produce an electromagnetic field in a formation adjacent a borehole;
   (c) means for rotating said electromagnetic field around a borehole to produce in at least one coil a signal having a modulation component representative of conductivity variations around a borehole; and
   (d) means responsive to said modulation component for bringing the effective axis of said rotating electromagnetic field into a substantially perpendicular direction to a formation plane having a lower conductivity gradient than other nearby formation planes to thereby determine the positioning of such a formation plane.

4. Apparatus for investigating earth formations traversed by a borehole, comprising:
   (a) at least one induction coil adapted to be magnetically coupled with a formation;
   (b) means for energizing said at least one coil at a first frequency to produce an electromagnetic field in a formation adjacent a borehole;
   (c) means for rotating said at least one coil about a movable axis at a second frequency to produce in at least one coil an amplitude modulated signal whose carrier frequency is said first frequency and whose modulation frequency is said second freqeuncy;
   (d) means for detecting the modulation frequency component of said amplitude modulated signal; and
   (e) means responsive to said detected modulation frequency component for bringing the axis of said rotating coil to a substantially perpendicular direction to a formation bedding plane to thereby determine the positioning of such a formation bedding plane.

5. Apparatus for investigating earth formations traversed by a borehole, comprising:
   (a) at least one induction coil adapted to be magnetically coupled with a formation;
   (b) means for energizing said at least one coil at a first frequency to produce an electromagnetic field in a formation adjacent a borehole;
   (c) means for generating current at a second frequency;
   (d) means responsive to the current at said second frequency for rotating said at least one coil about a movable axis to produce an amplitude modulated signal whose carrier frequency is said first frequency and whose modulation frequency is said second frequency;
   (e) means for detecting the modulation frequency component of said amplitude modulated signal to produce a modulation signal;
   (f) means responsive to that component of the modulation signal which is in-phase with the second frequency current for moving said coil axis in a rotational motion until the in-phase component of said modulation signal is reduced to a substantially null condition; and
   (g) means responsive to that component of the modulation signal which is in phase-quadrature with the second frequency current for moving said coil axis in an angular, dipping motion until the phase-quadrature component of said modulation signal is reduced to a substantially null condition whereby said coil axis will be aligned in a substantially perpendicular direction to a formation bedding plane to thereby determine the positioning of such a plane.

6. In apparatus for investigating earth formations traversed by a borehole, apparatus for positioning the axis around which a rotating exploring device can rotate, comprising:
   (a) a longitudinally extending support member adapted for movement through a borehole;
   (b) a first member supported by a first rotatable shaft whose axis of rotation is substantially fixed relative to said longitudinally extending support member;
   (c) a second rotatable shaft supported by said first member and adapted to rotate about a second axis which is substantially perpendicular to the axis of rotation of said first shaft;

(d) a second member supported by said second shaft;
(e) a third rotatable shaft supported by said second member, the axis of rotation of said third shaft being substantially perpendicular to said second axis; and
(f) an exploring device supported by said third shaft for rotation therewith whereby the rotatable positioning of said first and second axes will determine the axis around which the exploring device rotates.

7. Apparatus for investigating earth formations traversed by a borehole, comprising:
   (a) a longitudinally extending support member adapted for movement through a borehole;
   (b) a first member supported by a first rotatable shaft whose axis of rotation is substantially parallel to said longitudinally extending support member;
   (c) first moving means for rotating said first shaft;
   (d) a second rotatable shaft supported by said first member and adapted to rotate about a second axis which is substantially perpendicular to the axis of rotation of said first shaft;
   (e) a second member supported by said second rotatable shaft;
   (f) second moving means for rotating said second shaft;
   (g) a third rotatable shaft supported by said second member, the axis of rotation of said third shaft being substantially perpendicular to said second axis;
   (h) an exploring device supported by said third shaft;
   (i) means for rotating said third shaft at a given rate to thereby spin said exploring device;
   (j) means for energizing said exploring device to produce a signal representative of a formation characteristic; and
   (k) means responsive to said signal for energizing said first and second moving means to position the axis of rotation of said exploring device in accordance with said characteristic.

8. Apparatus for investigating earth formations traversed by a borehole, comprising:
   (a) a longitudinally extending support member adapted for movement through a borehole;
   (b) a first member supported by a first rotatable shaft whose axis of rotation is substantially parallel to said longitudinally extending support member;
   (c) a second rotatable shaft supported by said first member and adapted to rotate about a second axis which is substantially perpendicular to the axis of rotation of said first shaft;
   (d) a second member supported by said second shaft;
   (e) a third rotatable shaft supported by said second member, the axis of rotation of said third shaft being substantially perpendicular to said second axis;
   (f) a solenoid-type coil supported by said third shaft;
   (g) means for energizing said coil with current at a first frequency;
   (h) means for rotating said third shaft and coil at a second frequency to produce an amplitude modulated signal having a modulation component representative of the conductivity surrounding a borehole in said coil;
   (i) means for detecting the phase relationship of said modulation component to the rotational position of said third shaft and generating at least one signal representative thereof; and
   (j) means responsive to the phase relationship signal for rotating said first and second shafts to position the axis of rotation of said coil substantially perpendicularly with a formation plane having a lower conductivity gradient than other nearby formation planes whereby the positioning of such a low gradient formation plane can be determined.

9. Apparatus for investigating earth formations traversed by a borehole, comprising:
   (a) means for electromagnetically exploring at least one formation adjacent a borehole to produce signals representative of a characteristic of said at least one formation, including means for producing first and second electromagnetic fields at spaced apart locations in at least one formation surrounding a borehole;
   (b) means for rotating said first and second electromagnetic fields circumferentially around a borehole to cause said signals to have components representative of a formation characteristic at various circumferential portions of said spaced apart locations; and
   (c) means for combining the signals resulting from the spaced apart electromagnetic fields to produce an output signal which simulates an electromagnetic field rotating about an axis which is substantially perpendicular to a formation plane having a lower formation characteristic gradient than other nearby formation planes whereby the positioning of such a low gradient formation plane can be determined.

10. Apparatus for investigating earth formations traversed by a borehole, comprising:
    (a) means for electromagnetically exploring at least one formation adjacent a borehole to produce signals representtative of a characteristic of said at least one formation, including means for producing first and second electromagnetic fields at spaced apart locations in at least one formation surrounding a borehole;
    (b) means for rotating said first and second electromagnetic fields circumferentially around a borehole to cause said signals to have components representative of a formation characteristic at various circumferential portions of said spaced apart locations;
    (c) weighted combining means for combining the signals resulting from the spaced apart electromagnetic fields in accordance with selected weights, said combined signals being correlated with circumferential locations around a borehole; and
    (d) means responsive to the combined signals for adjusting the relative weights with which the signals resulting from the spaced apart fields are combined until the combined signals have a substantially constant amplitude for all circumferential locations around a borehole thus indicating the positioning of a formation plane having a lower formation characteristic gradient than other nearby formation planes.

11. Apparatus for investigating earth formations traversed by a borehole, comprising:
    (a) means for electromagnetically exploring at least one formation adjacent a borehole to produce signals representative of a characteristic of said at least one formation, including means for producing first and second electromagnetic fields at spaced apart locations in at least one formation surrounding a borehole;
    (b) means for rotating said first and second electromagnetic fields circumferentially around a borehole to cause said signals to have components representative of a formation characteristic at various
    (c) weighted combining means for combining in accordance with selected weights a signal resulting from the other of said fields, said two signals corresponding to the fields being aligned in the same circumferential direction; and
    (d) means responsive to the combined signals for adjusting the relative weights with which the signals resulting from the spaced apart fields are combined so that the combined signals will represent a single field located at some depth level lying between the two spaced apart depth levels thus indicating the positioning of at least one point on a formation plane having a lower formation conductivity gradient than other nearby formation planes to thereby enable determination of the positioning of such a low gradient plane.

12. Apparatus for investigating earth formations traversed by a borehole, comprising:
   (a) a first plurality of solenoid-type coils positioned to be coupled with various circumferential portions of a formation surrounding a borehole;
   (b) a second plurality of solenoid-type coils spaced apart from said first plurality of coils and positioned to be coupled with various circumferential portions of a formation surrounding a borehole;
   (c) means for sequentially coupling said first and second plurality of coils with at least one formation to produce signals in said coils having components representative of formation conductivity at various circumferential positions of said spaced apart locations around a borehole;
   (d) weighted combined means for combining the signals representative of conductivity at said two spaced apart locations in accordance with selected weights, the signals combined at any given time corresponding to the same circumferential direction; and
   (e) means responsive to the combined signals for adjusting the relative weights with which the signals are combined until the combined signals have a substantially constant amplitude for the various circumferential directions around a borehole, whereby the positioning of a formation plane having a lower conductivity gradient than other nearby formation planes can be determined.

13. Apparatus for investigating earth formations traversed by a borehole, comprising:
   (a) a first plurality of solenoid-type coils positioned to be coupled with various circumferential portions of a formation surrounding a borehole;
   (b) a second plurality of solenoid-type coils spaced apart from said first plurality of coils and positioned to be coupled with various circumferential portions of a formation surrounding a borehole;
   (c) means adapted for applying a signal at a first frequency to each one of said coils;
   (d) means for generating a signal at a second frequency;
   (e) means responsive to said second frequency signal for sequentially coupling said first and second plurality of coils with at least one formation to produce in said coils component signals having components representative of formation conductivity at various circumferential positions of said spaced apart locations around a borehole;
   (f) weighted combining means for combining in accordance with selected weights the signals representative of conductivity at said two spaced apart locations to produce an amplitude modulated signal, the signals combined at any given time corresponding to the same circumferential direction;
   (g) means for demodulating said amplitude modulated signal;
   (h) means for determining the phasing of the demodulated signal relative to said second frequency signal and producing at least one signal representative thereof; and
   (i) means responsive to said signal representative of phasing for adjusting the relative weights with which said component signals are combined until the combined signals will have a substantially constant amplitude for all circumferential directions around a borehole thus indicating the positioning of a formation plane having a lower conductivity gradient than other nearby formation planes.

14. Apparatus for investigating earth formations traversed by a borehole, comprising:
   (a) a plurality of coil pairs positioned to be coupled with individual circumferential portions of a formation surrounding a borehole, each coil pair comprised of two coils spaced apart along an axis substantially parallel to a borehole;
   (b) means for sequentially coupling each coil pair with at least one formation to produce a signal from each coil having a component representative of formation conductivity at a circumferential position adjacent each of said coils;
   (c) a weighting means associated with each coil pair for combining the signal from each coil of a coil pair in a selected relationship to produce a composite signal for each coil pair;
   (d) means for combining the composite signals to produce an output signal; and
   (e) means responsive to the output signal for adjusting the relationship with which the coil signals are weighted until each composite signal has substantially the same amplitude whereby the relationship with which the coil signals are combined indicates the positioning of a formation plane having a lower conductivity gradient than other nearby formation planes.

15. Apparatus for investigating earth formations traversed by a borehole, comprising:
   (a) a plurality of coil pairs positioned to be coupled with individual circumferential portions of a formation surrounding a borehole, each coil pair comprised of two coils spaced apart along an axis substantially parallel to a borehole;
   (b) means for sequentially coupling each coil pair with at least one formation to produce a signal from each coil having a component representative of formation conductivity at a circumferential position adjacent each of said coils;
   (c) a weighting means associated with each coil pair for combining the signal from each coil of a coil pair in a selected relationship to produce a composite signal for each coil pair;
   (d) means for combining the composite signals to produce an output signal;
   (e) means responsive to the output signal for determining the relative dip and azimuth of a formation bedding plane having a lower conductivity gradient than other nearby formation planes and generating signals representative thereof; and
   (f) means responsive to said relative dip and azimuth signals for adjusting the relationship with which said coil signals are weighted until each composite signal has substantially the same amplitude.

16. Apparatus for investigating earth formations traversed by a borehole, comprising:
   (a) a plurality of coil pairs positioned to be coupled with individual circumferential portions of a formation surrounding a borehole, each coil pair comprised of two coils spaced apart along an axis substantially parallel to a borehole;
   (b) means for applying a signal at a first frequency to each of said coils;
   (c) means for generating a signal having a second frequency;
   (d) means responsive to said second frequency signal for sequentially coupling each coil pair with at least one formation to produce a signal at said first frequency from each coil having a component representative of formation conductivity at a circumferential position adjacent each of said coils;
   (e) means for combining the coil signals to produce an amplitude modulated output signal;
   (f) means for demorulating the amplitude modulated output signal; and
   (g) means for determining the phasing of said demodulated signal relative to said second frequency signal to produce indications of the positioning of a formation bedding plane having a lower conductivity gradient than other nearby formation planes.

17. Apparatus for investigating earth formations traversed by a borehole, comprising:
 (a) a plurality of coil pairs positioned to be coupled with individual circumferential portions of a formation surrounding a borehole, each coil pair comprised of two coils spaced apart along an axis substantially parallel to a borehole;
 (b) means for applying a signal at a first frequency to each of said coils;
 (c) means for generating a signal having a second frequency;
 (d) means responsive to said second frequency signal for sequentially coupling each coil pair with at least one formation to produce a signal at said first frequency from each coil having a component representative of formation conductivity at a circumferential position adjacent each of said coils;
 (e) a weighting means associated with each coil pair for combining the signal from each coil of a coil pair in a selected relationship to produce a composite signal for each coil pair;
 (f) means for combining the composite signals to produce an amplitude modulated output signal;
 (g) means for demodulating the amplitude modulated output signal;
 (h) means for determining the phasing of said demodulated signal relative to said second frequency signal and generating at least one output signal representative thereof;
 (i) means responsive to said phasing output signal for determining parameters representative of the positioning of a formation plane having a lower conductivity gradient than other nearby formation planes and generating at least one output signal representative of such parameters; and
 (j) means responsive to said parameter output signal for generating output signals for adjusting the relationship with which each weighting means combines the coil signals to produce composite signals, said weighting relationships corresponding to ficitious coils located within the range defined by the coils of the various coil pairs to thereby indicate the positioning of said low gradient formation plane.

18. A method of investigating earth formations traversed by a borehole, comprising:
 (a) electromagnetically exploring a formation adjacent a borehole to produce a signal representative of formation conductivity, including producing an electromagnetic field in a formation adjacent a borehole;
 (b) rotating said electromagnetic field around a borehole to cause said signal to have a modulation component representative of conductivity variations around a borehole; and
 (c) adjusting the effective axis of said rotating electromagnetic field to a substantially perpendicular direction to a formation plane having a lower conductivity gradient than other formation planes in response to said modulation component to thereby determine the positioning of such a formation plane.

19. A method of investigation earth formations traversed by a borehole, comprising:
 (a) electromagneitcally exploring a formation adjacent a borehole to produce a signal representative of formation conductivity, including producing an electromagnetic field in a formation adjacent a borehole;
 (b) rotating said electromagnetic field around a borehole at a given frequency of rotation to cause said signal to have a modulation component representative of conductivity variations around a borehole;
 (c) demodulating said amplitude modulated signal to produce a modulation signal; and
 (d) adjusting the effective axis of rotation of said rotating electromagnetic field to a substantially perpendicular direction to a formation plane having a lower conductivity gradient than other formation planes in response to said modulation signal to thereby determine the positioning of such a low gradient formation plane.

20. A method of investigating earth formations traversed by a borehole, comprising:
 (a) energizing a coil with current at a first frequency to produce an electromagnetic field in a formation adjacent a borehole;
 (b) generating a signal at a second frequency;
 (c) rotating said electromagnetic field around a borehole at a frequency of rotation determined by said second frequency to produce in said coil an amplitude modulated signal having a modulation component representative of conductivity variations around a borehole;
 (d) demodulating said amplitude modulated signal to produce a modulation signal;
 (e) detecting the phasing of said modulation signal relative to said second frequency signal and generating at least one output signal representative thereof; and
 (f) adjusting the effective axis of rotation of said rotat-electromagnetic field to a substantially perpendicular direction to a formation plane having a lower conductivity gradient than other formation planes in response to said phasing output signal to thereby determine the positioning of such a formation plane.

21. A method of investigating earth formations traversed by a borehole, comprising:
 (a) energizing a coil with current at a first frequency to produce an electromagnetic field in a formation;
 (b) generating a signal at a second frequency;
 (c) rotating said coil about an adjustable axis in response to said second frequency signal to rotate said electromagnetic field around a borehole to produce in said coil an amplitude modulated signal having a modulation component representative of conductivity variations around a borehole;
 (d) demodulating said amplitude modulated signal to produce a modulation signal;
 (e) detecting the component of said modulation signal which is in-phase with said second frequency signal;
 (f) detecting the component of said modulation signal which is in phase-quadrature with said second frequency signal;
 (g) adjusting the axis of said rotating electromagnetic field to a substantially perpendicular direction to a formation plane having a lower conductivity gradient than other formation planes in response to said in-phase and phase-quadrature components; and
 (h) producing indications of the azimuth and dip-angle of said low gradient formation plane in response to said in phase and phase-quadrature components.

22. A method of investigating earth formations traversed by a borehole, comprising:
 (a) electromagnetically exploring at least one formation to produce signals representative of a characteristic of said at least one formation including producing first and second electromagnetic fields at spaced apart location in at least one formation surrounding a borehole;
 (b) rotating said first and second electromagnetic fields circumferentially around a borehole to cause said signals to have components representative of a formation characteristics at various circumferential portions of said spaced apart locations; and
 (c) combining the signals resulting from the spaced apart electromagnetic fields to produce an output signal which simulates an electromagnetic field rotating about an axis which is substantially perpendicular to a formation plane having a lower formation characteristic gradient than other nearby formation planes.

23. A method of investigating earth formations traversed by a borehole, comprising:
   (a) electromagnetically exploring at least one formation to produce signals representative of a characteristic of said at least one formation including producing first and second electromagnetic fields at spaced apart locations in at least one formation surrounding a borehole;
   (b) rotating said first and second electromagnetic fields circumferentially around a borehole to cause said signals to have components representative of a formation characteristic at various circumferential portions of said spaced apart locations;
   (c) combining the signals resulting from the spaced apart electromagnetic fields in accordance with selected weights, said combined signals being correlated with the circumferential locations around a borehole; and
   (d) adjusting the relative weights with which the signals resulting from the spaced apart fields are combined until the combined signals have a substantially constant amplitude for all circumferential locations around a borehole thus indicating the positioning of a formation plane having a lower formation characteristic gradient than other nearby formation planes.

24. A method of investigating earth formations traversed by a borehole, comprising:
   (a) electromagnetically exploring at least one formation to produce signals representative of a characteristic of said at least one formation including producing first and second electromagnetic fields at spaced apart locations in at least one formation surrounding a borehole;
   (b) rotating said first and second electromagnetic fields circumferentially around a borehole to cause said signals to have components representative of a formation characteristic at various circumferential portions of said spaced apart locations;
   (c) combining in accordance with selected weights the signals resulting from the spaced apart electromagnetic fields to produce amplitude modulated signals, said combined signals being correlated with the circumferential locations around a borehole;
   (d) demodulating the amplitude modulated signal to produce a modulation signal;
   (e) detecting the phasing of said modulation signal relative to the rotation of said electromagnetic field;
   (f) adjusting the relative weights with which the signals resulting from the spaced apart fields are combined in response to the detected phasing so that the combined signals will have a substantially constant amplitude for all circumferential locations around a borehole; and
   (g) indicating the positioning of a formation bedding plane in response to the detected phasing.

25. A method of investigating earth formations traversed by a borehole, comprising:
   (a) moving a plurality of coil pairs through a borehole, said coil pairs positioned to be coupled with individual circumferential portions of a formation surrounding a borehole, each coil pair comprised of two coils spaced apart along an axis substantially parallel to a borehole;
   (b) applying a signal at a first frequency to each of said coils;
   (c) generating a signal having a second frequency;
   (d) sequentially coupling each coil pair with at least one formation in response to said second frequency signal to produce a signal at said first frequency from each coil having a component representative of formation conductivity at a circumferential position adjacent each of said coils;
   (e) combining the coil signals to produce an amplitude modulated output signal;
   (f) demodulating the amplitude modulated output signal; and
   (g) determining the phasing of said demodulated signal relative to said second frequency signal to produce indications of the positioning of a formaation bedding plane having a lower conductivity gradient than other nearby formation planes.

26. A method of investigating earth formations traversed by a borehole, comprising:
   (a) moving a plurality of coil pairs through a borehole, said coil pairs positioned to be coupled with individual circumferential portions of a formation surrounding a borehole, each coil pair comprised of two coils spaced apart along an axis substantially parallel to a borehole;
   (b) applying a signal at a first frequency to each of said coils;
   (c) generating a signal having a second frequency;
   (d) sequentially coupling each coil pair with at least one formation in response to said second frequency signal to produce a signal at said first frequency from each coil having a component representative of formation conductivity at a circumferential position adjacent each of said coils;
   (e) combining the coil signals from the coils of each coil pair in a selected relationship to produce a composite signal for each coil pair;
   (f) combining the composite signals to produce an amplitude modulated output signal;
   (g) demodulating the amplitude modulated output signal;
   (h) determining the phasing of said demodulated signal relative to said second frequency signal and producing at least one output signal representative thereof;
   (i) adjusting the selected relationship with which the coil signals are combined in response to said phasing output signal; and
   (j) indicating the positioning of a formation bedding plane in response to said phasing output signal.

References Cited
UNITED STATES PATENTS

| | | | |
|---|---|---|---|
| 2,359,894 | 10/1944 | Brown et al. | 324—8 |
| 2,519,094 | 8/1950 | Zuschlag | 324—8 |
| 2,664,542 | 12/1953 | Lynn | 324—8 |
| 3,187,252 | 6/1965 | Hungerford | 324—6 |

GERARD R. STRECKER, Primary Examiner